A. S. BURDICK.
TIRE CASING.
APPLICATION FILED MAR. 29, 1917.
1,279,836.
Patented Sept. 24, 1918.
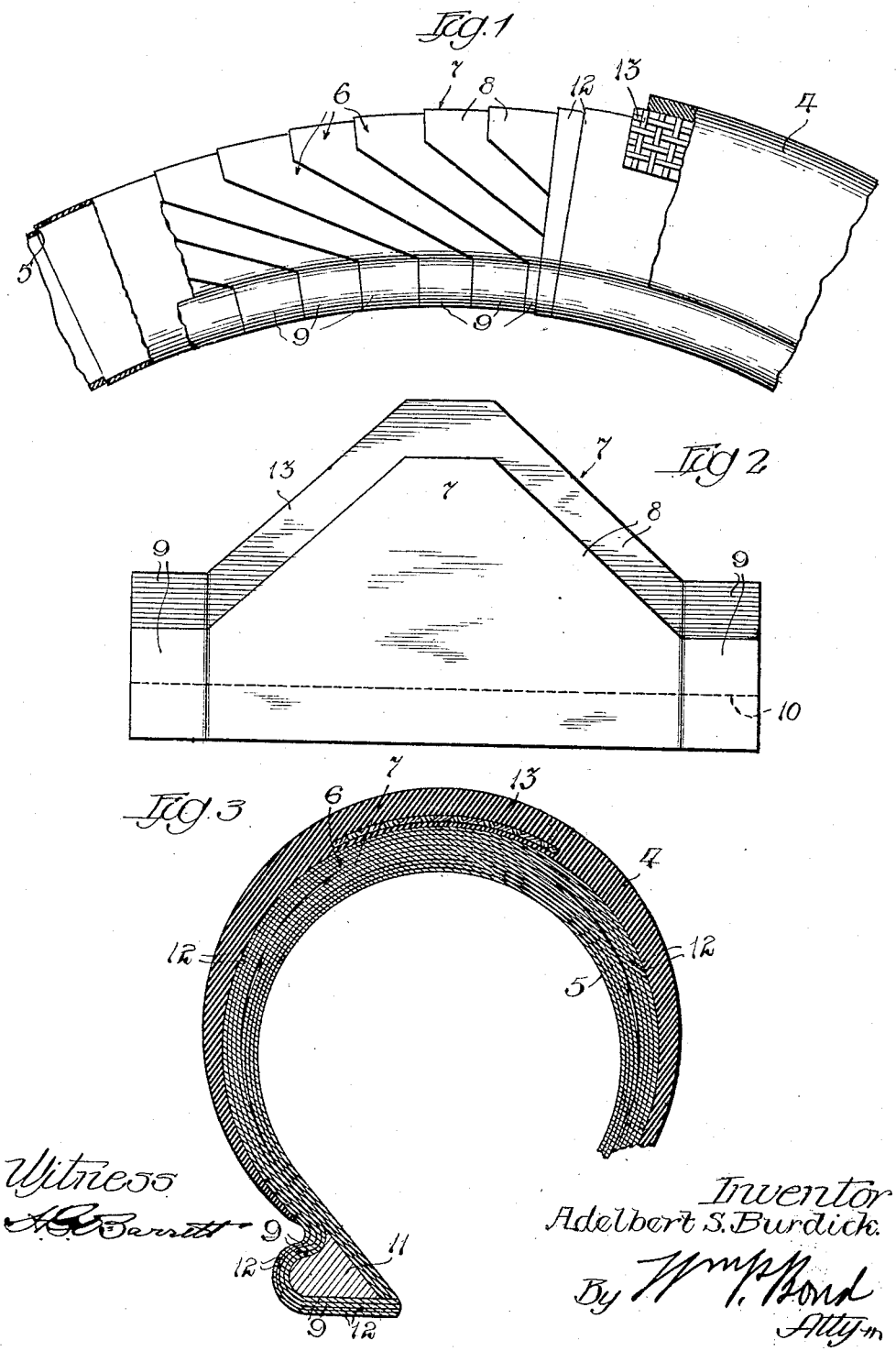
Witness
A. C. Barrett
Inventor
Adelbert S. Burdick.
By Wm. P. Bond
Atty.

UNITED STATES PATENT OFFICE.

ADELBERT S. BURDICK, OF CHICAGO, ILLINOIS, ASSIGNOR TO BURDICK TIRE & RUBBER COMPANY, OF CHICAGO, ILLINOIS, A CORPORATION OF DELAWARE.

TIRE-CASING.

1,279,836.  Specification of Letters Patent.  Patented Sept. 24, 1918.

Application filed March 29, 1917. Serial No. 158,420.

*To all whom it may concern:*

Be it known that I, ADELBERT S. BURDICK, a citizen of the United States, residing at Chicago, in the county of Cook and State of Illinois, have invented certain new and useful Improvements in Tire-Casings, of which the following is a specification.

The present invention relates to the construction and arrangement of a casing used in connection with the ordinary pneumatic tire.

One object of the invention is to provide a casing which shall be reinforced about the tread and side portions by means of a reinforcing section comprised of a series of overlapped pieces of fabric.

A further object of the invention is to so construct the parts comprising this reinforcing section as to obtain a plurality of layers about the tread and sides of the tire where the reinforcement is necessary, but to eliminate the production of an undesirable number of layers of fabric about the bead portion of the tire, thereby eliminating the creation of an objectionable thickness at this point.

The invention further consists in the features of construction and combination of parts hereinafter described and claimed.

The present invention is an improvement upon the tire shown and described in Letters Patent of the United States No. 1,032,544, granted to Hess and Burdick, but dealing with a novel configuration of the pieces which comprise the reinforcing portion of the tire, whereby the said reinforcing portion can be applied to the bead of the tire without producing an undesirable number of layers of fabric at this point.

In the drawings:

Figure 1 is a side view, partly in section, showing the arrangement of the various sections comprising the tire casing with respect to one another;

Fig. 2 is an elevation on an enlarged scale of two of the sections or pieces of fabric which go to constitute the reinforcing section of the tire; and Fig. 3 is a cross section of the tire casing of the present invention.

Referring now to the drawings, the casing as there illustrated comprises an outer section 4, an inner section 5, and an intermediate reinforcing section 6. The outer section 4 can be of any suitable composition or material, and the outer tread surface thereof can be formed in any suitable or desired manner. The inner section 5 consists of the usual layers of fabric joined together in any suitable and well-known manner.

The intermediate section 6, which is the reinforcing part of the tire, contains the subject matter of the present invention. This section is composed of a series of fabric pieces, each comprising a body 7, which is cut to produce a tongue-like extending portion 8, which, as shown in the drawings, is of a substantially triangular shape. And at each side of the lower end of said tongue portion are oppositely extending tab portions 9, which, as shown in the drawing, are substantially rectangular in formation. The fabric pieces 7 are laid one upon the other, as illustrated in Fig. 2, and cemented or otherwise joined together, and are arranged so that the lower edge 10 of one fabric piece lies approximately medially of the tab portions 9 of the fabric piece that is superimposed upon the first piece of fabric; that is to say, each tab section breaks joints with the tab section of the fabric pieces lying adjacent thereto. A length of fabric is built up in this manner, and is then secured in any suitable manner to the inner portion 5 of the tire. When so placed in position, it will be seen that the tongue portions of the fabric pieces will constitute a multi-ply layer of fabric about the tread and sides of the tire casing, protecting and reinforcing this section of the casing, which is most susceptible to punctures and blow-outs.

The tab portions 9 will continue down and extend around the bead 11 of the tire and will at no point make more than a double thickness of fabric at this point, so that no undue bulging will be present at the bead of the tire, which is highly undesirable, in that it tends to eliminate the clencher effect of said bead. After this reinforced portion has been placed in position, it may, if desired, be covered with a plurality of fabric sections 12, which extend completely around the reinforcing portion and around the tire bead, as will be understood from Figs. 1 and 3.

By reinforcing or decreasing the length of the tongue portions of the fabric pieces, said tongue portions will overlap one another a greater or less distance, producing a greater or less number of layers of fabric about the tread and sides of the casing; but under no circumstances would this affect the number of layers present about the bead of the tire, since, owing to the presence of the tab sections which extend from the fabric strips and pass around said bead, there would never be more than a double ply of fabric where the reinforcing section passes around the bead of the tire. If desired, a suitable breaker strip 13 may be inserted at the tread portion of the tire to provide more protection at this point against punctures, etc.

The entire casing is very cheap and simple of construction and when made as above described can be applied without changing the general contour and arrangement of the ordinary tire casing.

I claim:

A tire comprising an outer tread section, an inner fabric section, and an intermediate reinforcing section, said reinforcing section comprising a series of overlapped fabric pieces joined together to make an elongated strip, each piece being cut to provide a straight bottom edge, a side edge extending from each end of the bottom edge and at right angles thereto, an intermediate edge extending inward from the upper end of each side edge and parallel to the bottom edge, an angularly disposed edge extending upward from the inner end of each intermediate edge, with said angularly disposed edges extending in converging relation to one another to the top of the piece, the point of juncture of said angularly disposed edges with the intermediate edges being arranged to come at the point of bend of the tire bead, whereby each piece gradually increases in width from its top to the inner ends of the intermediate edges and is of uniform width from said intermediate edges to the bottom edges thereof, thereby giving when said pieces are arranged in overlapped relation to form the strip a maximum thickness of layers at the tire tread, with said thicknesses gradually decreasing to the point of bend over the bead and giving a uniform minimum thickness of layers from said point of bend to the lower edge of the bead, whereby an easy bending of that portion of the strip extending around the bead is obtained and excessive bulging about the bead eliminated, substantially as described.

A. S. BURDICK.

Copies of this patent may be obtained for five cents each, by addressing the "Commissioner of Patents. Washington, D. C."